United States Patent
Bang et al.

(10) Patent No.: US 12,277,019 B2
(45) Date of Patent: Apr. 15, 2025

(54) ELECTRONIC DEVICE AND METHOD FOR CONTROLLING OVERHEAT OF THE ELECTRONIC DEVICE BASED ON CONTROLLING BACKGROUND PROCESS IN THE ELECTRONIC DEVICE

(71) Applicant: SAMSUNG ELECTRONICS CO., LTD., Suwon-si (KR)

(72) Inventors: Sungyong Bang, Suwon-si (KR); Jongwoo Kim, Suwon-si (KR); Hyunjin Noh, Suwon-si (KR); Hakryoul Kim, Suwon-si (KR); Mooyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 17/987,166

(22) Filed: Nov. 15, 2022

(65) Prior Publication Data

US 2023/0185356 A1 Jun. 15, 2023

Related U.S. Application Data

(63) Continuation of application No. PCT/KR2022/017069, filed on Nov. 2, 2022.

(30) Foreign Application Priority Data

Dec. 9, 2021 (KR) .................. 10-2021-0175497
Jan. 6, 2022 (KR) .................. 10-2022-0002253

(51) Int. Cl.
G06F 1/20 (2006.01)
G06F 1/3287 (2019.01)
G06F 1/329 (2019.01)

(52) U.S. Cl.
CPC .............. *G06F 1/329* (2013.01); *G06F 1/206* (2013.01); *G06F 1/3287* (2013.01)

(58) Field of Classification Search
CPC ........ G06F 1/206; G06F 1/3287; G06F 1/329; Y02D 10/00
USPC .......................... 700/300; 713/300; 718/102
See application file for complete search history.

(56) References Cited

U.S. PATENT DOCUMENTS

2007/0011660 A1  1/2007  Garyali et al.
2009/0064164 A1*  3/2009  Bose .................... G06F 9/5094
                                                                    718/105

(Continued)

FOREIGN PATENT DOCUMENTS

CN        107391259        11/2017
CN        107479951        12/2017

(Continued)

OTHER PUBLICATIONS

International Search Report dated Jan. 27, 2023 for PCT/KR2022/017069.
PCT Written Opinion dated Jan. 27, 2023 for PCT/KR2022/017069.

*Primary Examiner* — Chun Cao
(74) *Attorney, Agent, or Firm* — Nixon & Vanderhye P.C.

(57) ABSTRACT

An electronic device may include a communication module, a temperature sensor, a memory and a processor operatively connected to the communication module, the temperature sensor, and the memory, wherein the processor is configured to identify whether the electronic device is in an overheating state, perform first scheduling by using a scheduling method designated for processes, when the electronic device is not in the overheating state, and control the processes based on the first scheduling, and, when the electronic device is in the overheating state, identify processor usage of at least one background process among the processes, identify at least one background process group based on the processor usage (Continued)

of the at least one background process, identify a first time interval, in which the at least one background process group operates, and a second time interval, in which the at least one background process group does not operate, perform second scheduling for the processes based on the first time interval and the second time interval, and control the processes based on the second scheduling.

20 Claims, 8 Drawing Sheets

(56) References Cited

U.S. PATENT DOCUMENTS

| | | |
|---|---|---|
| 2013/0239114 A1 | 9/2013 | Dinker |
| 2014/0089603 A1* | 3/2014 | Krishnapura ....... G06F 12/0831 |
| | | 711/146 |
| 2015/0046685 A1 | 2/2015 | Park et al. |
| 2016/0026507 A1 | 1/2016 | Muckle et al. |
| 2017/0344100 A1* | 11/2017 | Shi .......................... G06F 1/206 |
| 2019/0108066 A1* | 4/2019 | Kim ...................... G06F 9/5044 |
| 2019/0327359 A1* | 10/2019 | Guo ...................... G06F 1/3206 |
| 2019/0332326 A1 | 10/2019 | Lv et al. |
| 2021/0026709 A1 | 1/2021 | Noh et al. |
| 2021/0247823 A1 | 8/2021 | Bang et al. |

FOREIGN PATENT DOCUMENTS

| | | |
|---|---|---|
| JP | 2000-322278 | 11/2000 |
| KR | 10-2013-0121412 A | 11/2013 |
| KR | 10-2017-0108636 A | 9/2017 |
| KR | 10-2021-0101081 | 8/2021 |
| WO | 2021/157913 | 8/2021 |

* cited by examiner

ELECTRONIC DEVICE AND METHOD FOR CONTROLLING OVERHEAT OF THE ELECTRONIC DEVICE BASED ON CONTROLLING BACKGROUND PROCESS IN THE ELECTRONIC DEVICE

CROSS-REFERENCE TO RELATED APPLICATIONS

This application is a continuation of International Application No. PCT/KR2022/017069, filed Nov. 2, 2022, designating the United States, in the Korean Intellectual Property Receiving Office, and claiming priority to KR Patent Application No. 10-2021-0175497, filed Dec. 9, 2021, and to KR Patent Application No. 10-2022-0002253, filed Jan. 6, 2022, the disclosures of which are all hereby incorporated by reference herein in their entireties.

BACKGROUND

Field

Various embodiments relate to an electronic device and a method for controlling overheating in an electronic device.

Description of Related Art

There has been widespread use of various electronic devices such as a smartphone, a tablet PC, a portable multimedia player (PMP), a personal digital assistant (PDA), a laptop personal computer, and a wearable device.

In line with such technical development, various types of electronic devices have been developed, and such electronic devices are required to have better performance. As electronic devices operate to satisfy such performance demands, the amount of heat generated thereby increases gradually, and power consumption also increases.

SUMMARY

Overheating control may be performed to reduce or prevent overheating in an electronic device. For example, in order to reduce or prevent overheating in an electronic device, if the overheating temperature of the electronic device reaches a designated temperature or higher (for example, if overheating state is reached), the usage of a processor (for example, central processing unit (CPU), application processor (AP), or communication processor (CP)) of processes (for example, applications or programs) may be limited from the maximum or a high level (for example, 100%) to a designated usage. For example, the processor of the electronic device may periodically stop and then resume all processing of processes (for example, background processes) in an overheating state such that the CPU usage is reduced, thereby lowering the overheating temperature. However, if all processing of background processes is periodically stopped and then resumed in this manner, the load may be instantly increased by batch processing of the background processes when processing of the background processes is resumed. This may cause overheating and thus may not be effective. Therefore, there may be a need for a scheme which can reduce the CPU usage of background processors in an overheating state, and which can control overheating more effectively.

Various embodiments may provide an electronic device and a method for controlling overheating, based on background process control, in the electronic device, wherein, instead of repeatedly suspending and resuming all background processes in an overheating state, the background processes are grouped based on the CPU usage of respective background processes, and respective background groups are suspended and resumed at different suspension time-points.

According to various embodiments, an electronic device may include a communication module comprising communication circuitry, a temperature sensor, a memory and a processor operatively connected, directly or indirectly, to the communication module, the temperature sensor, and the memory, wherein the processor may be configured to identify whether the electronic device is in an overheating state, when the electronic device is not in the overheating state, perform first scheduling by using a scheduling method designated for processes, and control the processes based on the first scheduling, and when the electronic device is in the overheating state, identify processor usage of at least one background process among the processes, identify at least one background process group based on the processor usage of the at least one background process, identify a first time interval, in which the at least one background process group operates, and a second time interval, in which the at least one background process group does not operate, perform second scheduling for the processes based on the first time interval and the second time interval, and control the processes based on the second scheduling.

According to various embodiments, a method for controlling overheating based on background process control in an electronic device may include identifying whether the electronic device is in an overheating state, when the electronic device is not in the overheating state, performing first scheduling by using a scheduling method designated for processes, and controlling the processes based on the first scheduling, and when the electronic device is in the overheating state, identifying processor usage of at least one background process among the processes, identifying at least one background process group based on the processor usage of the at least one background process, identifying a first time interval, in which the at least one background process group operates, and a second time interval, in which the at least one background process group does not operate, performing second scheduling for the processes based on the first time interval and the second time interval, and controlling the processes based on the second scheduling.

According to various embodiments, in connection with a non-volatile storage medium storing commands, the commands may be configured to cause, when being executed by at least one processor, the at least one processor to perform at least one operation, and the at least one operation may include identifying whether the electronic device is in an overheating state, when the electronic device is not in the overheating state, performing first scheduling by using a scheduling method designated for processes, and controlling the processes based on the first scheduling, and when the electronic device is in the overheating state, identifying processor usage of at least one background process among the processes, identifying at least one background process group based on the processor usage of the at least one background process, identifying a first time interval, in which the at least one background process group operates, and a second time interval, in which the at least one background process group does not operate, performing second scheduling for the processes based on the first time interval and the second time interval, and controlling the processes based on the second scheduling.

According to various embodiments, instead of repeatedly suspending and resuming all background processes in an overheating state, the background processes may be grouped based on the CPU usage of respective background processes, and respective background groups are suspended and resumed at different suspension timepoints, thereby enabling effective overheating control.

Advantageous effects obtainable are not be limited to the above mentioned effects, and other effects which are not mentioned may be clearly understood, through the following descriptions, by those skilled in the art to which the disclosure pertains.

BRIEF DESCRIPTION OF DRAWINGS

The above and other aspects, features, and advantages of certain example embodiments will be more apparent from the following detailed description, taken in conjunction with the accompanying drawings, in which.

In describing the drawings, identical or similar reference numerals may be used to denote identical or similar elements.

DETAILED DESCRIPTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Figure 1:
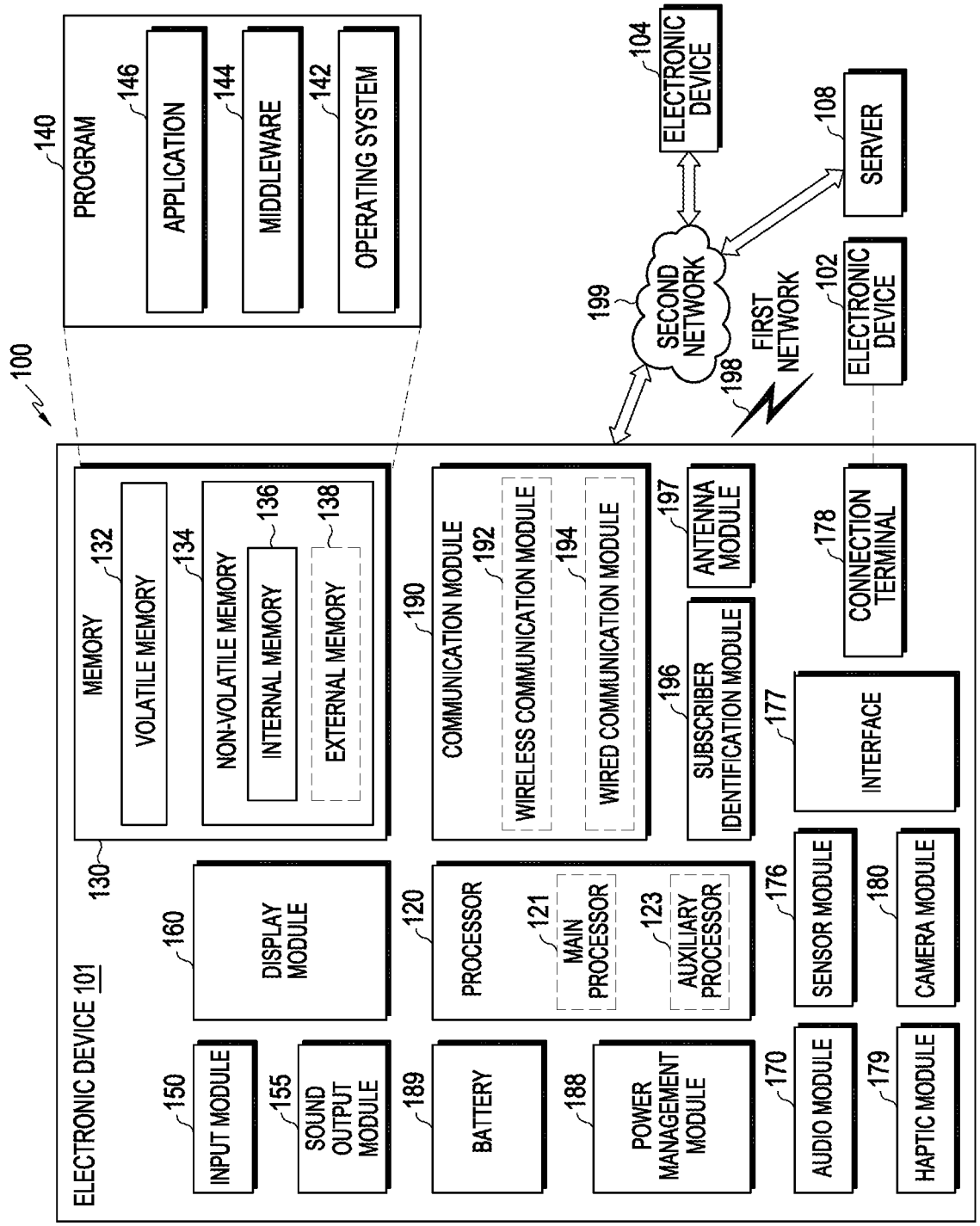
FIG. 1 is a block diagram of an electronic device in a network environment according to an example embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example.

The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Hereinafter, an example of an electronic device according to various embodiments will be described.

Figure 2:
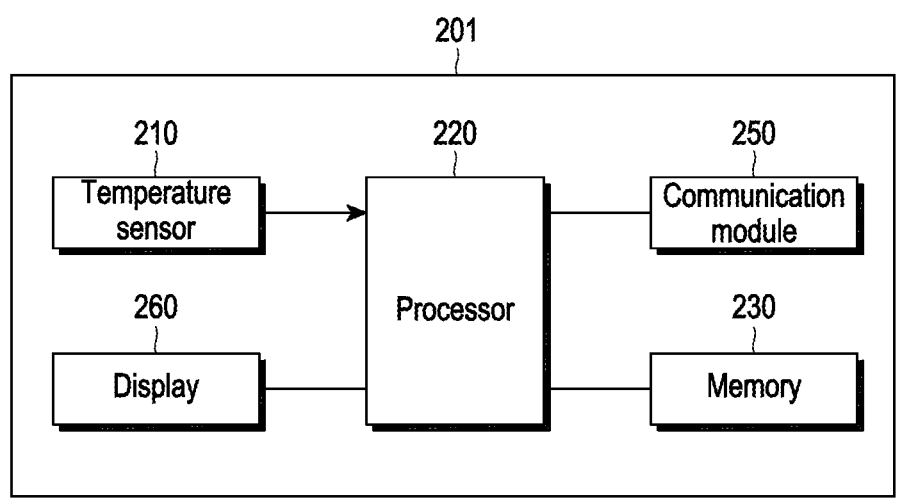
FIG. 2 is a block diagram showing elements of an electronic device according to an embodiment.

FIG. 2 is a block diagram showing elements of an electronic device 201 according to an embodiment. Each embodiment herein may be used in combination with any other embodiment(s) described herein.

Referring to FIG. 2, the electronic device 201 according to an embodiment may include, for example, all or parts of the electronic device 101 illustrated in FIG. 1. According to an embodiment, the electronic device 201 may include a temperature sensor 210 (e.g., the sensor module 176 in FIG. 1, including at least one sensor), at least one processor 220 (e.g., the processor 120 in FIG. 1, an application processor (AP), or a central processing unit (CPU)), a memory 230 (e.g., the memory 130 in FIG. 1), a communication module 250 (e.g., the communication module 190 in FIG. 1, including communication circuitry), and a display 260 (e.g., the display module 160 in FIG. 1, including a display). According to an embodiment, in the electronic device 201, at least one of the elements may be omitted, or another element may be additionally included. In FIG. 2, a term such as "~module" in the electronic device 201 implies a unit that processes at least one function or operation, and may be implemented as hardware or software and a combination of hardware and software. The term "module" in the electronic device 201 may be replaced with terms, such as "~circuitry", "~unit", "~device". Each "module" herein may comprise circuitry.

According to an embodiment, the temperature sensor 210 may include at least one temperature sensor. For example, at least one temperature sensor 210 may be multiple thermistors disposed in the electronic device 201. The temperature sensor 210 may measure the temperature of at least one element (e.g., the processor 220, the communication module 250, or the display 260) included in the electronic device 201. For example, the temperature sensor 210 may output temperature information based on a resistance value that changes depending on temperature, or temperature information sensed by the temperature sensor 210 may be identified by the processor 220. Each processor herein may comprise processing circuitry.

The temperature sensor 210 according to an embodiment may operate under control of the processor 220. For example, the temperature sensor 210 may transmit temperature information (e.g., a resistance value, raw data, a temperature value, a temperature state, or an overheating state) to the processor 220 in response to a command of the processor 220, and, in response thereto, the processor 220 may identify (determine or acquire) the temperature of at least one element (e.g., the processor 220). According to an embodiment, the temperature sensor 210 may be disposed on the surface of the electronic device 201 or at a position corresponding to at least one heating source (e.g., an element designated as a heating source) of the elements included in the electronic device 201. For example, the heating source may include at least one among the processor 220, the communication module 250, an antenna module (e.g., the antenna module 197 in FIG. 1), a battery (e.g., the battery 189 in FIG. 1). The temperature sensor 210 may transmit, to the processor 220, temperature information related to the elements included in the electronic device 201. Alternatively, when the temperature sensor 210 is disposed adjacent to the surface of the electronic device 201, the temperature sensor 210 may be disposed adjacent to the surface of the electronic device 201 in a housing (not shown) of the electronic device 201. The temperature sensor 210 may transmit temperature information of the surface of the electronic device 201 to the processor 220.

According to an embodiment, the processor 220 may use the temperature sensor 210 to identify (or acquire) temperature information of the electronic device 201 or the heating source included in the electronic device 201. Alternatively, the processor 220 may identify (or acquire) a heating temperature by using temperature information from at least one temperature sensor 210 disposed adjacent to the surface of the electronic device 201. For example, the processor 220 may identify temperature information periodically acquired through the temperature sensor 210 according to a designated period to identify heating temperature of the electronic device 201 (or at least one element included in the electronic device 201).

According to an embodiment, the processor 220 may identify (or determine) heating temperature by using the temperature information acquired through the at least one temperature sensor 210 and an algorithm (e.g., a linear regression analysis algorithm) that is stored in the memory 230 to predict the heating temperature. For example, the processor 220 may identify (or determine) heating temperature by performing a linear regression analysis algorithm prediction based on the temperature information identified from the temperature sensor 210 and the operation type of an electronic device (e.g., the electronic device 101 in FIG. 1 or the electronic device 201 in FIG. 2). For example, the operation type of the electronic device 101 or 201 may be determined based on operation characteristics of one or multiple elements in operation (being executed, being driven, turned-on, and/or activated) among the elements included in the electronic device 101 or 201. For example, the operation type of the electronic device 101 or 201 may be designated based on operation characteristics of at least one element of the electronic device 101 or 201. For example, a first operation type may be designated based on an operation characteristic (e.g., a charging current intensity (e.g., 1A, 2A, or another current intensity)) of a power management module (e.g., the power management module 188 in FIG. 1) (or a charger IC) among the elements included in the electronic device 101 and an operation characteristic (e.g., a volume level (e.g., 7, 5, mute, or another volume level)) of the sound output module 155 (or a speaker). A second operation type may be designated based on the brightness of the display module 260, or whether the display module 260 (comprising a display) has a high refresh rate. A third operation type may be designated based on transmission/reception power values of an antenna module (e.g., the antenna module 197 in FIG. 1). A fourth operation type may be designated based on the on/off state of a Bluetooth module (e.g., the communication module 190 in FIG. 1, comprising communication circuitry). A fifth operation type may be designated based on the on/off state of a 5G communication function of the communication module 190. In addition, the operation type may be designated as various operation types by single or combined operation characteristics of various elements. For example, the processor 220 may predict a first heating temperature based on identified first temperature information and based on an operation characteristic (e.g., a charging current intensity or a speaker volume level) of the first operation type, and may identify (or determine) the predicted first heating temperature as the heating temperature of the electronic device 201.

According to an embodiment, the electronic device 201 may identify (or acquire) a predicted heating temperature through learning related to the operation type of the electronic device 201. For example, the processor 220 may learn temperature information corresponding to each operation type, and may identify heating temperature according to each operation type by using the information acquired through the learning.

According to an embodiment, the processor 220 may identify whether there is an overheating state according to the heating temperature, and when there is the overheating state, may identify an overheating level. For example, the processor 220 may identify that the electronic device 201 is in an overheating state when the heating temperature is equal to or higher than a first designated temperature (e.g., a first temperature threshold or 38 degrees Celsius), and may identify that the electronic device 201 is in a non-overheating state (e.g., a normal state) when the heating temperature is lower than the first designated temperature (e.g., the first temperature threshold or 38 degrees Celsius). According to an embodiment, when being in an overheating state, the processor 220 may identify an overheating level (or overheating degree) based on a heating temperature. For example, as the heating temperature further rises from a designated temperature, the processor 220 may identify an overheating level as a high level.

Table 1 below may be a table showing examples of overheating levels based on heating temperature according to an embodiment(s).

TABLE 1

| Heating temperature (or Surface temperature) | Overheating level |
|---|---|
| Not lower than 38 degrees but lower than 40 degrees | First overheating level (or light) |

TABLE 1-continued

| Heating temperature (or Surface temperature) | Overheating level |
|---|---|
| Not lower than 40 degrees but lower than 42 degrees | Second overheating level (or moderate) |
| Not lower than 42 degrees but lower than 45 degrees | Third overheating level (or severe) |
| 45 or higher | Fourth overheating level (or critical) |

Referring to Table 1, the processor 220 according to an embodiment may identify a first overheating level when the heating temperature is not lower than 38 degrees but lower than 40 degrees. The processor 220 according to an embodiment may identify a second overheating level when the heating temperature is not lower than 40 degrees but lower than 42 degrees. The processor 220 according to an embodiment may identify a third overheating level when the heating temperature is not lower than 42 degrees but lower than 45 degrees. The processor 220 according to an embodiment may identify a fourth overheating level when the heating temperature is 45 degrees or higher. According to an embodiment, in Table 1, the overheating level is divided into first to fourth overheating level with reference to 38 degrees to 45 degrees. However, the above-mentioned temperature and overheating level are only examples, and the processor 220 may be configured to further or less identify other overheating level at various other temperature intervals. When the electronic device 201 is in a non-overheating state (e.g., an ordinary state or a normal state), the processor 220 according to an embodiment may perform first scheduling with respect to processes (e.g., a foreground process and at least one background process in operation) by using a designated scheduling method, and may perform processing of the processes based on the first scheduling. For example, the processor 220 may distribute, based on a first scheduling method, a foreground process per one time slot (or a processing unit time) based on a clock of the processor 220 and appropriately distribute at least one background process to the remaining time after the distribution of the foreground process, so that the processes are processed. For example, scheduling may be an operation of determining which of processes to be processed (e.g., processes in a ready queue or a foreground process and at least one background process) should be allocated to the processor (e.g., a CPU). For example, the designated scheduling method may include a first-come first-served scheduling method, a shortest-job-first scheduling method, a shortest-remaining-time-first scheduling method, a priority scheduling method, a round robin scheduling method, a multilevel queue scheduling method, or other scheduling methods.

When the state of the electronic device 201 is an overheating state, the processor 220 according to an embodiment may identify processor usage (CPU usage) limit information associated with background processes and at least one background process. For example, the background process may be a background process operating in the background at a time when an overheating state is identified. For example, the processor usage limit information may include a processor usage limit value. For example, the processor usage limit value may include a designated value (e.g., 20%). For example, the processor usage limit value may be designated as an appropriate value based on a heating characteristic of the electronic device 201 or an element included in the electronic device 201 according to the use of the processor 220, and may be changeable. The processor usage limit value, 20%, may imply a value that limits the processor 220 to use only 20% of the total processor usage (100%) to process the background process. The processor 220 according to an embodiment may identify one of multiple overheating levels in the overheating state, and the multiple overheating levels may be states in which respective processor usage limit values are configured to be different from each other. For example, the processor 220 may identify a processor usage limit value as a first limit value (e.g., 20%) in the first overheating level, may identify a processor usage limit value as a second limit value (e.g., 15%) in the second overheating level, may identify a processor usage limit value as a third limit value (e.g., 10%) in the third overheating level, and may identify a processor usage limit value as a fourth limit value (e.g., 0%) in the fourth overheating level. The processor usage limit value according to the overheating level may be configured as a value different from the above-mentioned example.

The processor 220 according to an embodiment may identify the processor usage of the at least one background process. For example, the processor 220 may acquire a process identification number (PID) and/or a user identification number (UID) and processor usage of each of at least one background process required to be controlled in the background in an overheating state, and may list and store the PID and/or the UID and the processor usage of each of the at least one background process.

Table 2 below may be a table showing a list of processor usage of at least one background process in an example embodiment(s).

TABLE 2

| Process name | PID | UID | Processor usage (CPU usage) | Grade |
|---|---|---|---|---|
| ABC | 11111 | 1234 | 8% | 2 |
| aabbcc | 12222 | 1325 | 5% | 2 |
| zzz | 13333 | 1587 | 3% | 3 |
| asdfasdf | 14444 | 1694 | 2% | 3 |

Referring to Table 2, when a background process operating in an overheating state includes ABC, aabbcc, zzz, and asdfasdf, the processor 220 according to an embodiment may store a PID (and/or a UID) and processor usage of each of ABC, aabbcc, zzz, and asdfasdf, and may further store a grade according to the processor usage. For example, the grade according to the processor usage may be higher as the processor usage is higher. The processor 220 according to an embodiment may identify at least one background process group based on processor usage limit information and the processor usage of each of the at least one background process. For example, the processor 220 may identify, based on the processor usage of each of the at least one background process, at least one background process group including at least one background process capable of operating within the processor usage limit value. For example, the processor 220 may designate a first background process having the highest processor usage, among the at least one background process, as a first background process group, and may designate at least one other background process as the first background process group in a range in which the processor usage of the first background process group does not exceed the processor usage limit value. When there are remaining processes other than the process designated as the first background process group, the processor 220 may designate a second background process having the highest processor usage, among the other remaining processes, as a second background process group, and may include, in the second background process group, at least one other background process, for which a group is not designated, in a range in which the processor usage of the second background process group does not exceed the processor usage limit value. The processor 220 according to an embodiment may cause groups to be designated for all background processes in the same way as described above, and may identify a background process group that minimizes or reduces a difference in a processor usage for each background process group. For example, when the processor usage limit value is 20%, when the background process includes first to fourth background processes, when the processor usage of the first background process is 15%, when the processor usage of the second background process is 12%, when the processor usage of the third background process is 5%, and when the processor usage of the fourth background process is 3%, the processor 220 may designate the first background process (a process having the highest processor usage) and the fourth background process as the first background process group, and may designate the second process (a process having a high processor usage after designating the first background process group) and the third background process as the second background process group. In another example, the processor 220 may identify, based on the grade of background processes instead of %, at least one background process group including a combination of at least one background process (e.g., a higher grade and a lower grade) that can operate within the processor usage limit value.

The processor 220 according to an embodiment may identify a first time interval and a second time interval associated with at least one background process group. For example, the first time interval (e.g., a time slot corresponding to the first time interval) may be a time interval in which the at least one background process group is operated (or processed) by the processor 220. For example, the second time interval (e.g., a time slot corresponding to the second time interval) may be a time interval (e.g., an idle time interval) in which the processor 220 does not process a background process. According to an embodiment, the processor 220 may identify, based on the number of the at least one background process group, the number of time slots corresponding to the first time interval associated with the at least one background process group and the number of time slots corresponding to the second time interval. According to an embodiment, the number of time slots corresponding to the first time interval may be equal to the number of time slots corresponding to the second time interval, or the number of time slots corresponding to the second time interval may be greater than the number of time slots corresponding to the first time interval. For example, the higher the overheating level is, the greater the number of time slots corresponding to the second time intervals is. For example, when the number of the at least one background process group at the first overheating level is N, the processor 220 may identify, as N, the number of time slots corresponding to the first time interval associated with the at least one background process group, and may identify, as N, the number of time slots corresponding to the second time interval which is an idle period between the at least one background process group. For example, when the number of the at least one background process group at the second overheating level is N, the processor 220 may identify, as N, the number of time slots corresponding to the first time interval associated with the at least one background process group, and may identify, as 2*N, the number of time slots corresponding to the second time interval which is an idle period between the at least one background process group.

For example, when the number of the at least one background process group at the third overheating level is N, the processor 220 may identify, as N, the number of time slots corresponding to the first time interval associated with the at least one background process group, and may identify, as 3*N, the number of time slots corresponding to the second time interval which is an idle period between the at least one background process group. For example, the number of time slots corresponding to the second time interval may be smaller or greater.

The processor 220 according to an embodiment may perform second scheduling for processes, based on the first time interval and the second time interval associated with the at least one background process group. For example, the processor 220 may perform the second scheduling for distributing a foreground process and/or a default process (e.g., an externally uncontrollable process or a system process) to each of time intervals based on the clock of the processor 220, wherein a background process group is distributed to a time remaining after the distribution of a foreground process and/or the default process in the first time interval among the time intervals, and the second time interval becomes an idle period after the distribution of a foreground process and/or a default process thereto.

The processor 220 according to an embodiment may process, based on the second scheduling, processes allocated to the time intervals. For example, the processor 220 may process, in the first time interval, the foreground process and/or the default process and background processes of the background process group, and may process the foreground process and/or the default process in the second time interval.

According to an embodiment, when being in an overheating state, the processor 220 may configure first time intervals and second time intervals with respect to time intervals for processing processes (a foreground process, a default process, and background process). At least one second time interval may be configured after a first time interval, and a first time interval may be configured again after the at least one second time interval. According to various embodiments, it will be readily understood by those skilled in the art that the number of background processes or background process groups may be various depending on a user's electronic device usage situation in addition to the above-mentioned examples, and that the number of first time intervals and second time intervals may also be configured as various numbers based on the number of background process groups.

The memory 230 according to an embodiment may store various data used by at least one element of the electronic device 201 (e.g., the temperature sensor 210, the processor 220, the communication module 250 and/or the display 260). The data may include, for example, input data or output data on software (e.g., a program) and a command related thereto. For example, the memory 230 may store instructions for performing an operation of the electronic device 201 (or the processor 220). According to an embodiment, the memory 230 may store information or data for identifying at least one overheating state, and may store information or data for performing second scheduling based on background process identification.

The communication module 250 according to an embodiment may support establishment of a communication channel (a wired communication channel or a wireless communication channel) and communication using the established communication channel According to an embodiment, the communication module 250, comprising communication circuitry, may use control of the processor 220 or a communication processor thereof to transmit or receive communication data or receive a call.

The display 260 according to an embodiment may include a touch screen, may display various types of display data based on an operation of the processor 220, and may receive an input (e.g., a touch input) associated with process processing. For example, the display 260 may display display-data associated with an overheating state and/or an overheating level and display-data associated with process processing. For example, the display 260 may display, based on control of the processor 220, display data indicating whether the electronic device 201 is in an overheating state or in a normal state (non-overheating state), may display display data indicating which of first overheating level to fourth overheating level is the overheating level, or may display display data generated in connection with process processing.

According to various embodiments, an electronic device (e.g., the electronic device 101 in FIG. 1 or the electronic device 201 in FIG. 2) may include a communication module (e.g., the communication module 190 in FIG. 1 or the communication module 250 in FIG. 2, each comprising communication circuitry), a temperature sensor (e.g., the sensor module 176 in FIG. 1 or the temperature sensor 210 in FIG. 2), a memory (e.g., the memory 130 in FIG. 1 or the memory 230 in FIG. 2), and a processor (e.g., the processor 120 in FIG. 1 or the processor 220 in FIG. 2) operatively connected, directly or indirectly, to the communication module, the temperature sensor, and the memory, wherein the processor is configured to identify whether the electronic device is in an overheating state, perform first scheduling by using a scheduling method designated for processes, when the electronic device is not in the overheating state, and control the processes based on the first scheduling, and, when the electronic device is in the overheating state, identify processor usage of at least one background process among the processes, identify at least one background process group based on the processor usage of the at least one background process, identify a first time interval, in which the at least one background process group operates, and a second time interval, in which the at least one background process group does not operate, perform second scheduling for the processes based on the first time interval and the second time interval, and control the processes based on the second scheduling.

According to various embodiments, the processor may be configured to identify an overheating level of the electronic device in the overheating state.

According to various embodiments, the processor may be configured to identify a processor usage limit value corresponding to the overheating state or identify a processor usage limit value corresponding to the overheating level.

According to various embodiments, the processor usage limit value corresponding to the overheating level may be configured to decrease as the overheating level increases.

According to various embodiments, the processor may be configured to identify the at least one background process group, based on the processor usage limit value and the processor usage of the at least one background process.

According to various embodiments, the processor is configured to identify, based on the number of the at least one background process group, the number of time slots corresponding to the first time interval and the number of time slots corresponding to the second time interval, and perform the second scheduling for the processes, based on the number of time slots corresponding to the first time interval and the number of time slots corresponding to the second time interval.

According to various embodiments, the number of time slots corresponding to the second time interval may be configured to have a greater value than the number of time slots corresponding to the first time interval as the overheating level of the electronic device increases.

According to various embodiments, the processor is configured to identify the number of time slots corresponding to the first time interval as N and the number of time slots corresponding to the second time interval as N when the number of the at least one background process group at a first overheating level is N.

According to various embodiments, the processor is configured to identify the number of time slots corresponding to the first time interval as N and the number of time slots corresponding to the second time interval as 2*N when the number of the at least one background process group at a second overheating level is N.

According to various embodiments, the processes may include a foreground process, a default process, and the at least one background process.

Figure 3:
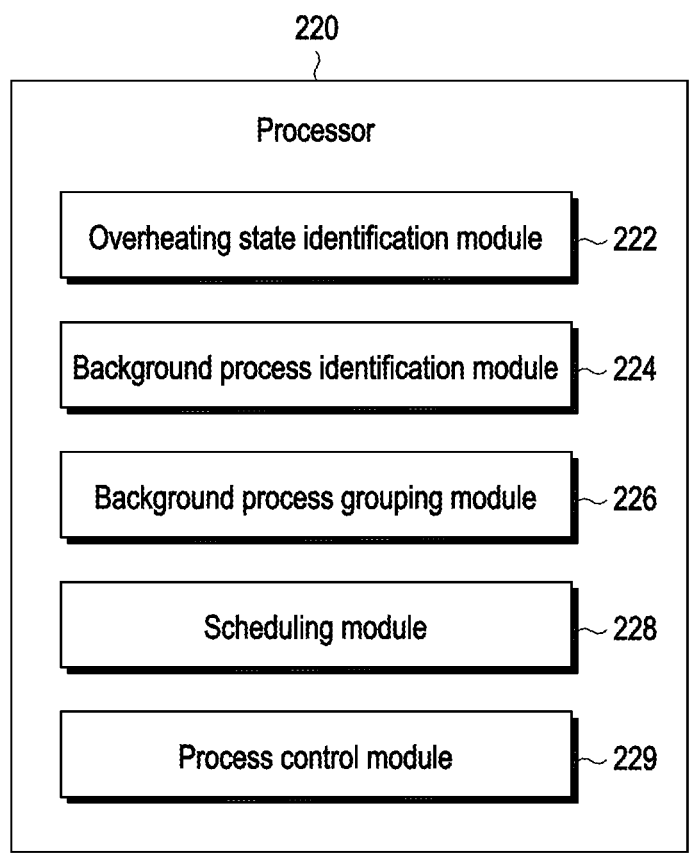
FIG. 3 illustrates elements of a processor in an electronic device according to an example embodiment.

FIG. 3 illustrates elements of a processor in an electronic device according to an embodiment.

Referring to FIG. 3, a processor 220 of an electronic device (e.g., the electronic device 101 in FIG. 1 or the electronic device 201 in FIG. 2) (hereinafter, the electronic device 201 in FIG. 2 will be described as an example) may perform operations of an overheating state identification module 222, a background process identification module 224, a background process grouping module 226, a scheduling module 228, and a process processing module (or a process control module) 229. For example, the overheating state identification module 222, the background process identification module 224, the background process grouping module 226, the scheduling module 228, and/or the process processing module 229 may be a software module executed by the processor 220. Alternatively, the overheating state identification module 222, the background process identification module 224, the background process grouping module 226, the scheduling module 228, and the process processing module 229 may be hardware modules which are included in or exist independently of the processor 220.

The overheating state identification module 222 according to an embodiment may identify heating temperature, based on temperature information sensed by the temperature sensor 210, and may identify whether there is an overheating state according to the heating temperature. In the case of an overheating state, the overheating state identification module 222 may identify an overheating level. For example, when the heating temperature is a first designated temperature (e.g., the first temperature threshold or 38 degrees Celsius), the overheating state identification module 222 may identify that the electronic device 201 is in an overheating state, and when the heating temperature is lower than the first designated temperature (e.g., the first temperature threshold or 38 degrees Celsius), the overheating state identification module 222 may identify that the state of the electronic device 201 is a non-overheating state (e.g., a normal state). According to an embodiment, in the overheating state, the overheating state identification module 222 may identify an overheating level (or overheating degree) based on the heating temperature. For example, the processor 220 may identify the overheating level as a high level as the heating temperature further rises from a designated temperature.

In the case of an overheating state, the background process identification module 224 according to an embodiment may identify whether processes requiring control are in the background to identify at least one background process. In the overheating state, the background process identification module 224 according to an embodiment may acquire a process identification number (PID) and/or user identification number (UID) and processor usage of each of the at least one background process requiring control in the background, and may transmit the PID and/or UID and the processor usage of each of the at least one background process to the background process grouping module 226. The background process identification module 224 according to an embodiment may further transmit a grade according to the processor usage of each of the at least one background process to the background process grouping module 226.

The background process grouping module 226 according to an embodiment may receive the overheating level identified by the overheating state identification module 222, and may receive a process identification number (PID) and/or user identification number (UID) and processor usage of each of at least one background process requiring control in the background in the overheating state and a grade. The background process grouping module 226 according to an embodiment may identify a processor usage (CPU usage) limit value associated with background processes according to the overheating level, and may identify at least one background process group, based on the processor usage (CPU usage) limit value and the processor usage of each of the at least one background process. For example, the background process grouping module 226 may identify, based on the processor usage of each of the at least one background process, at least one background process group including at least one background process capable of operating within the processor usage limit value. For example, the background process grouping module 226 may designate a first background process having the highest processor usage, among at least one background process, as a first background process group, and may designate at least one other background process as the first background process group in a range in which the processor usage of the first background process group does not exceed a processor usage limit value. When there are remaining processes other than the process designated as the first background group, the background process grouping module 226 may designate a second background process having the highest processor usage, among the other remaining processes, as a second background process group, and may include at least one other background process, for which a group is not designated, in the second background process group in a range in which the processor usage of the second background process group does not exceed the processor usage limit value. The background process grouping module 226 according to an embodiment may cause groups to be designated for all background processes in the same way as described above, and may identify a background process group that minimizes or reduces a difference in a processor usage for each background process group. In another example, the processor 220 may identify, based on the grade of background processes, at least one background process group including a combination of at least one background process (e.g., a higher grade and a lower grade) that can operate within the processor usage limit value.

The background process grouping module 226 according to an embodiment may identify a first time interval (e.g., a time slot corresponding to the first time interval) and a second time interval (e.g., a time slot corresponding to the second time interval) associated with at least one background process group. For example, first time interval may be a time interval in which the at least one background process group is operated (or processed) by the processor 220. For example, the second time interval may be a time interval (e.g., an idle time interval) in which the processor 220 does not process a background process. According to an embodiment, the background process grouping module 226 may identify, based on the number of at least one background process group, the number of time slots corresponding to the first time interval associated with the at least one background process group and the number of time slots corresponding to the second time interval. According to an embodiment, the number of time slots corresponding to the first time interval may be equal to the number of time slots corresponding to the second time interval, or the number of time slots corresponding to the second time interval may be greater than the number of time slots corresponding to the first time interval. For example, the higher the overheating level is, the greater the number of time slots corresponding to the second time intervals is. For example, when the number of at least one background process group at the first overheating level is N, the background process grouping module 226 may identify, as N, the number of time slots corresponding to the first time interval associated with the at least one background process group, and may identify, as N, the number of time slots corresponding to the second time interval which is an idle period between the at least one background process group. For example, when the number of at least one background process group at the second overheating level is N, the background process grouping module 226 may identify, as N, the number of time slots corresponding to the first time interval associated with the at least one background process group, and may identify, as 2*N, the number of time slot corresponding to the second time interval which is an idle period between the at least one background process group. For example, when the number of at least one background process group at the third overheating level is N, the background process grouping module 226 may identify, as N, the number of time slots corresponding to the first time interval associated with the at least one background process group, and may identify, as 3*N, the number of time slots corresponding to the second time interval which is an idle period between the at least one background process group. For example, the number of time slots corresponding to the second time interval may be smaller or greater.

The scheduling module 228 according to an embodiment may perform scheduling (e.g., second scheduling) for processes, based on the first time interval and the second time interval associated with the at least one background process group. For example, the scheduling module 228 may perform the second scheduling for distributing a foreground process and/or a default process (e.g., an externally uncontrollable process or a system process) to each of time intervals based on the clock of the processor 220, wherein a background process group is distributed to a time remaining after the distribution of a foreground process and/or a default process in the first time interval among the time intervals, and the second time interval becomes an idle period after the distribution of a foreground process and/or a default process thereto. For example, the scheduling module 228 may designate, as a first time interval, one time interval among time intervals for processing processes (a foreground process, a default process, a background process) and then may designate at least one next time interval as a second time interval, and may designate a first time interval again after the second time interval.

The process control module 229 according to an embodiment may control (process), based on the scheduling of the scheduling module 228, processes allocated to time intervals. For example, the process control module 229 may process background processes of a background process group after processing a foreground process and/or a default process in the first time interval, and may rest (or wait) after processing the foreground process and/or the default process in the second time interval.

Figure 4:
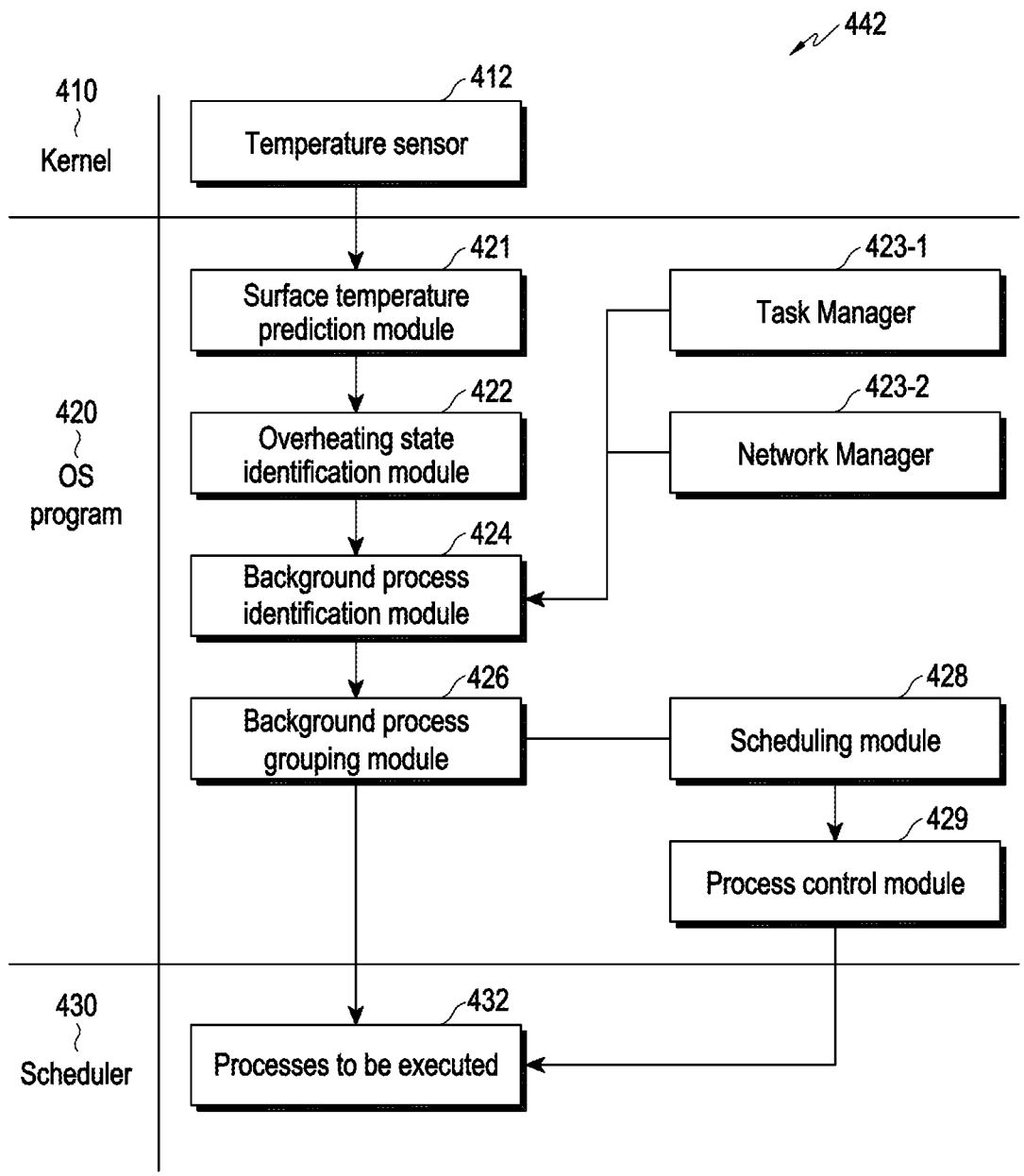
FIG. 4 illustrates an operating system of an electronic device according to an example embodiment.

FIG. 4 illustrates an operating system of an electronic device according to an embodiment.

Referring to FIG. 4, an operating system 442 (e.g., the operating system 142 in FIG. 1) of an electronic device (e.g., the electronic device 101 in FIG. 1 or the electronic device 201 in FIG. 2) (hereinafter, the electronic device 201 in FIG. 2 will be described as an example) according to an embodiment may include a kernel 410, an OS program 420, and a scheduler 430.

The kernel 410 according to an embodiment may include a temperature sensor module 412, comprising at least one sensor, capable of serving as an interface between a hardware (e.g., the temperature sensor 210) and an application program (e.g., the OS program 420 or Android OS program), and may provide temperature information sensed by the temperature sensor 210 to the OS program 420 through the temperature sensor module 412.

The OS program 420 according to an embodiment may be a program that provides an environment in which the processor 220 is capable of controlling hardware included in the electronic device 201 and executing application software. The OS program 420 according to an embodiment may include a surface temperature prediction module 421, an overheating state identification module 422, a task manager 423-1, a network manager 423-2, a background process identification module 424, a background process grouping module 426, a scheduling module 428, and/or a process control module 429. The surface temperature prediction module 421 may measure or predict the surface temperature or heating temperature of the electronic device 201. The overheating state identification module 422, the background process identification module 424, the background process grouping module 426, the scheduling module 428, and the process control module 429 may perform the same operations as the overheating state identification module 222, the background process identification module 224, the background process grouping module 226, the scheduling module 228, and the process control module 229 in FIG. 3, respectively. Each of the task manager 423-1 and the network manager 423-2 may manage a task (or process) that is newly executed or stopped in the electronic device 201, or a task (or process) that is newly executed or stopped by communication through a network, and may provide background process information that changes depending on the execution or stopping of task execution.

The scheduler 430 according to an embodiment may change, based on control of the process control module 429, processes to be executed according to scheduling by the scheduling module 428 to an executed state. Processes to be executed 432 according to an embodiment may be executed based on scheduling by the scheduler 430.

Figure 5:
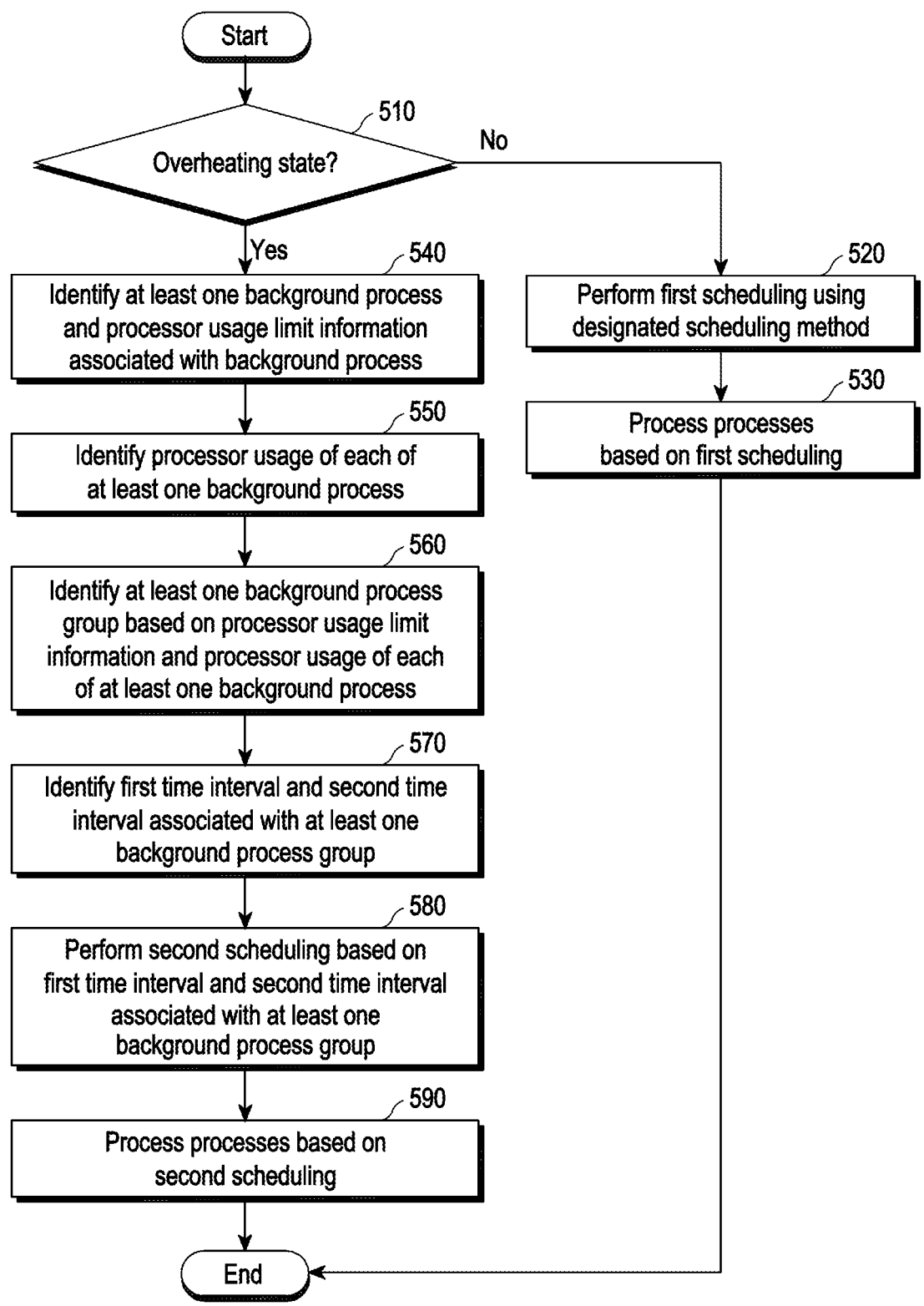
FIG. 5 is a flowchart showing an overheat control operation based on background process control in an electronic device according to an example embodiment.

FIG. 5 is a flowchart showing an overheat control operation based on background process control in an electronic device according to an embodiment.

Referring to FIG. 5, a processor (e.g., the processor 120 in FIG. 1 or the processor 220 in FIG. 2) (hereinafter, the processor 220 in FIG. 2 will be described as an example) of an electronic device (e.g., the electronic device 101 in FIG. 1 or the electronic device 201 in FIG. 2) according to an embodiment may perform at least one of operations 510 to 590.

In operation 510, the processor 220 according to an embodiment may identify whether the electronic device 201 is in an overheating state. For example, when an overheating temperature is higher than or equal to a first designated temperature (e.g., the first temperature threshold or 38 degrees Celsius), the processor 220 may identify that the electronic device 201 is in an overheating state, and when the heating temperature is lower than the first designated temperature (e.g., the first temperature threshold 38 degrees Celsius), the processor 220 may identify that the electronic device 201 is a non-overheating state (e.g., a normal state). According to an embodiment, when being in an overheating state, the processor 220 may identify an overheating level (or overheating degree) based on a heating temperature. For example, as the heating temperature further rises from a designated temperature, the processor 220 may identify an overheating level as a high level. For example, when the heating temperature is not lower than 38 degrees but lower than 40 degrees, the processor 220 may identify a first overheating level. When the heating temperature is not lower than 40 degrees but lower than 42 degrees, the processor 220 according to an embodiment may identify a second overheating level. When the heating temperature is not lower than 42 degrees but lower than 45 degrees, the processor 220 according to an embodiment may identify a third overheating level. When the heating temperature is 45 degrees or higher, the processor 220 according to an embodiment may identify a fourth overheating level. According to an embodiment, the above-mentioned temperature and overheating level are only examples, and the processor 220 may be configured to further or less identify other overheating levels at various other temperature intervals.

In operation 520, when the electronic device 201 is in a non-overheating state (No to 510 in FIG. 5) (e.g., an ordinary state or a normal state), the processor 220 according to an embodiment may perform first scheduling with respect to processes (e.g., a foreground process and at least one background process in operation) by using a designated scheduling method.

In operation 530, the processor 220 according to an embodiment may perform processing of the processes based on the first scheduling. For example, the processor 220 may distribute, based on a first scheduling method, a foreground process per one time slot (or a processing unit time) based on a clock of the processor 220 and appropriately distribute at least one background process to the remaining time after the distribution of the foreground process, so that the processes are processed. For example, scheduling may be an operation of determining which of processes to be processed (e.g., processes in a ready queue or a foreground process and at least one background process) should be allocated to the processor (e.g., a CPU).

In operation 540, when the state of the electronic device 201 is an overheating state (Yes in 510 of FIG. 5), the processor 220 according to an embodiment may identify processor usage (CPU usage) limit information associated with background processes and at least one background process. For example, the background process may be a background process operating in the background at a time when an overheating state is identified. For example, the processor usage limit information may include a processor usage limit value. For example, the processor usage limit value may include a designated value (e.g., 20%). For example, the processor usage limit value may be designated as an appropriate value based on a heating characteristic of the electronic device 201 or an element included in the electronic device 201 according to the use of the processor 220, and may be changeable. The processor usage limit value, 20%, may imply a value that limits the processor 220 to use only 20% of the total processor usage (100%) to process the background process. The processor 220 according to an embodiment may identify one of multiple overheating levels in the overheating state, and the multiple overheating levels may be states in which respective processor usage limit values are configured to be different from each other. For example, the processor 220 may identify a processor usage limit value as a first limit value (e.g., 20%) in the first overheating level, may identify a processor usage limit value as a second limit value (e.g., 15%) in the second overheating level, may identify a processor usage limit value as a third limit value (e.g., 10%) in the third overheating level, and may identify a processor usage limit value as a fourth limit value (e.g., 0%) in the fourth overheating level. The processor usage limit value according to the overheating level may be configured as a value different from the above-mentioned example.

In operation 550, the processor 220 according to an embodiment may identify the processor usage of each of the at least one background process. For example, the processor 220 may identify a process identification number (PID) and/or a user identification number (UID) and processor usage of each of at least one background process required to be controlled in the background in an overheating state. The processor 220 according to an embodiment may store the PID (and/or UID) and the processor usage of each of at least one background process operating in the overheating state, and may further store a grade according to the processor usage. For example, the grade according to the processor usage may be higher as the processor usage is higher.

In operation 560, the processor 220 according to an embodiment may identify at least one background process group based on processor usage limit information and the processor usage of each of the at least one background process. For example, the processor 220 may identify, based on the processor usage of each of the at least one background process, at least one background process group including at least one background process capable of operating within the processor usage limit value. For example, the processor 220 may designate a first background process having the highest processor usage, among the at least one background process, as a first background process group, and may designate at least one other background process as the first background process group in a range in which the processor usage of the first background process group does not exceed the processor usage limit value. When there are remaining processes other than the process designated as the first background process group, the processor 220 may designate a second background process having the highest processor usage, among the other remaining processes, as a second background process group, and may include, in the second background process group, at least one other background process, for which a group is not designated, in a range in which the processor usage of the second background process group does not exceed the processor usage limit value. The processor 220 according to an embodiment may cause groups to be designated for all background processes in the same way as described above, and may identify a background process group that minimizes or reduces a difference in a processor usage for each background process group. In another example, the processor 220 may identify, based on the grade of background processes, at least one background process group including a combination of at least one background process (e.g., a higher grade and a lower grade) that can operate within the processor usage limit value.

In operation 570, the processor 220 according to an embodiment may identify a first time interval and a second time interval associated with the at least one background process group. For example, the first time interval (e.g., a time slot corresponding to the first time interval) may be a time interval in which the at least one background process group is operated (or processed) by the processor 220. For example, the second time interval (e.g., a time slot corresponding to the second time interval) may be a time interval (e.g., an idle time interval) in which the processor 220 does not process a background process. According to an embodiment, the processor 220 may identify, based on the number of the at least one background process group, the number of time slots corresponding to the first time interval associated with the at least one background process group and the number of time slots corresponding to the second time interval. According to an embodiment, the number of time slots corresponding to the first time interval may be equal to the number of time slots corresponding to the second time interval, or the number of time slots corresponding to the second time interval may be greater than the number of time slots corresponding to the first time interval. For example, the higher the overheating level is, the greater the number of time slots corresponding to the second time intervals is. For example, when the number of the at least one background process group at the first overheating level is N, the processor 220 may identify, as N, the number of time slots corresponding to the first time interval associated with the at least one background process group, and may identify, as N, the number of time slots corresponding to the second time interval which is an idle period between the at least one background process group. For example, when the number of the at least one background process group at the second overheating level is N, the processor 220 may identify, as N, the number of time slots corresponding to the first time interval associated with the at least one background process group, and may identify, as 2*N, the number of time slots corresponding to the second time interval which is an idle period between the at least one background process group. For example, when the number of the at least one background process group at the third overheating level is N, the processor 220 may identify, as N, the number of time slots corresponding to the first time interval associated with the at least one background process group, and may identify, as 3*N, the number of time slots corresponding to the second time interval which is an idle period between the at least one background process group. For example, the number of time slots corresponding to the second time interval may be smaller or greater.

In operation 580, the processor 220 according to an embodiment may perform second scheduling for processes, based on the first time interval and the second time interval associated with the at least one background process group. For example, the processor 220 may perform the second scheduling for distributing a foreground process and/or a default process (e.g., an externally uncontrollable process or a system process) to each of time intervals based on the clock of the processor 220, wherein a background process group is distributed to the remaining time after the distribution of a foreground process and/or a default process in the first time interval among the time intervals, and the second interval becomes an idle period after the distribution of a foreground process and/or a default process thereto.

In operation 590, the processor 220 according to an embodiment may process, based on the second scheduling, processes allocated to the time intervals. For example, the processor 220 may process, in the first time interval, the foreground process and/or the default process and background processes of the background process group, and may process the foreground process and/or the default process in the second time interval.

According to various embodiments, a method for controlling overheating based on background process control in an electronic device (e.g., the electronic device 101 in FIG. 1 or the electronic device 201 in FIG. 2) may include identifying whether the electronic device is in an overheating state, performing first scheduling by using a scheduling method designated for processes, when the electronic device is not in the overheating state, and controlling the processes based on the first scheduling, and, when the electronic device is in the overheating state, identifying processor usage of at least one background process among the processes, identifying at least one background process group based on the processor usage of the at least one background process, identifying a first time interval, in which the at least one background process group operates, and a second time interval, in which the at least one background process group does not operate, performing second scheduling for the processes based on the first time interval and the second time interval, and controlling the processes based on the second scheduling.

According to various embodiments, the method may further include identifying an overheating level of the electronic device in the overheating state.

According to various embodiments, the method may further include identifying a processor usage limit value corresponding to the overheating state or identifying a processor usage limit value corresponding to the overheating level.

According to various embodiments, in the method, the processor usage limit value corresponding to the overheating level may be configured to decrease as the overheating level increases.

According to various embodiments, the method may further include identifying the at least one background process group, based on the processor usage limit value and the processor usage of the at least one background process.

According to various embodiments, the method may further include identifying, based on the number of the at least one background process group, the number of time slots corresponding to the first time interval and the number of time slots corresponding to the second time interval, and performing the second scheduling for the processes, based on the number of time slots corresponding to the first time interval and the number of time slots corresponding to the second time interval.

According to various embodiments, in the method, the number of time slots corresponding to the second time interval may be configured to have a greater value than the number of time slots corresponding to the first time interval as the overheating level of the electronic device increases.

According to various embodiments, the method may further include identifying the number of time slots corresponding to the first time interval as N and the number of time slots corresponding to the second time interval as N when the number of the at least one background process group at a first overheating level is N.

According to various embodiments, the method may further include identifying the number of time slots corresponding to the first time interval as N and the number of time slots corresponding to the second time interval as 2*N when the number of the at least one background process group at a second overheating level is N.

Figure 6:
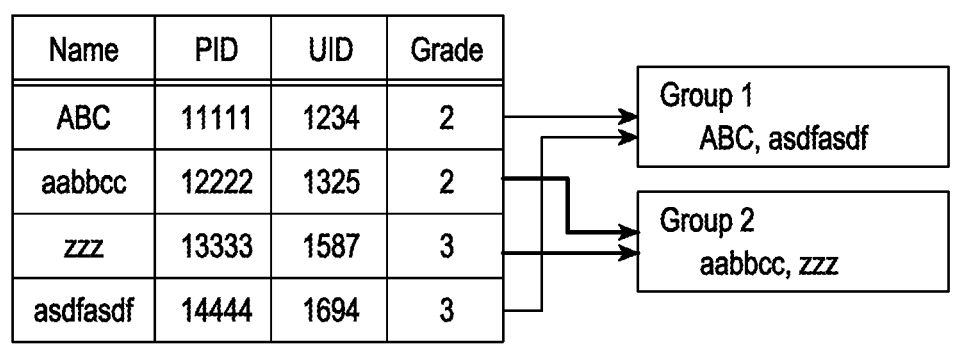
FIG. 6 illustrates an example of a background process group according to an example embodiment.

FIG. 6 illustrates an example of a background process group according to an embodiment.

Referring to FIG. 6, a processor (e.g., the processor 120 in FIG. 1 or the processor 220 in FIG. 2) (hereinafter, the processor 220 in FIG. 2 will be described as an example) of an electronic device (e.g., the electronic device 101 in FIG. 1 or the electronic device 201 in FIG. 2) according to an embodiment may identify at least one background process group, based on processor usage limit information (e.g., 10%) and the processor usage (e.g., 8%, 5%, 3%, and 2%) of at least one background process (ABC, aabbcc, zzz, and asdfasdf). For example, the processor 220 may identify, based on the processor usage (e.g., 8%, 5%, 3%, and 2%) of the at least one background process (e.g., ABC, aabbcc, zzz, and asdfasdf), a first background process group (Group 1) and a second background process group (Group 2) capable of operating within a processor usage limit value (e.g., 20%). For example, the processor 220 may designate, as the first background process group (Group 1), a background process ABC having the highest processor usage among the at least one background process, and may designate a background process asdfasdf, which is at least one other background process, as the first background process group (Group 1) in a range in which the processor usage of the first background process group (Group 1) does not exceed the processor usage limit value (e.g., 10%). When there are remaining processes other than the process designated as the first background process group (Group 1), the processor 220 may designate, as the second background process group (Group 2), a background aabbcc having the highest processor usage among the other remaining processes, and may designate a background process zzz, for which a group is not designated, as the second background process group (Group 2) in a range in which the processor usage of the second background process group (Group 2) does not exceed the processor usage limit value (e.g., 10%). The processor 220 according to an embodiment may cause groups to be designated for all background processes in the same way as described above, and may designate a background process group that minimizes a difference in processor usage for each background process group. In another example, the processor 220 may also identify, based on the grade of background processes, the first background group (Group 1) and the second background group (Group 2) including a combination of at least one background process (e.g., grade 2 and grade 3) capable of operating within the processor usage limit value. "Based on" as used herein covers based at least on.

Figure 7:
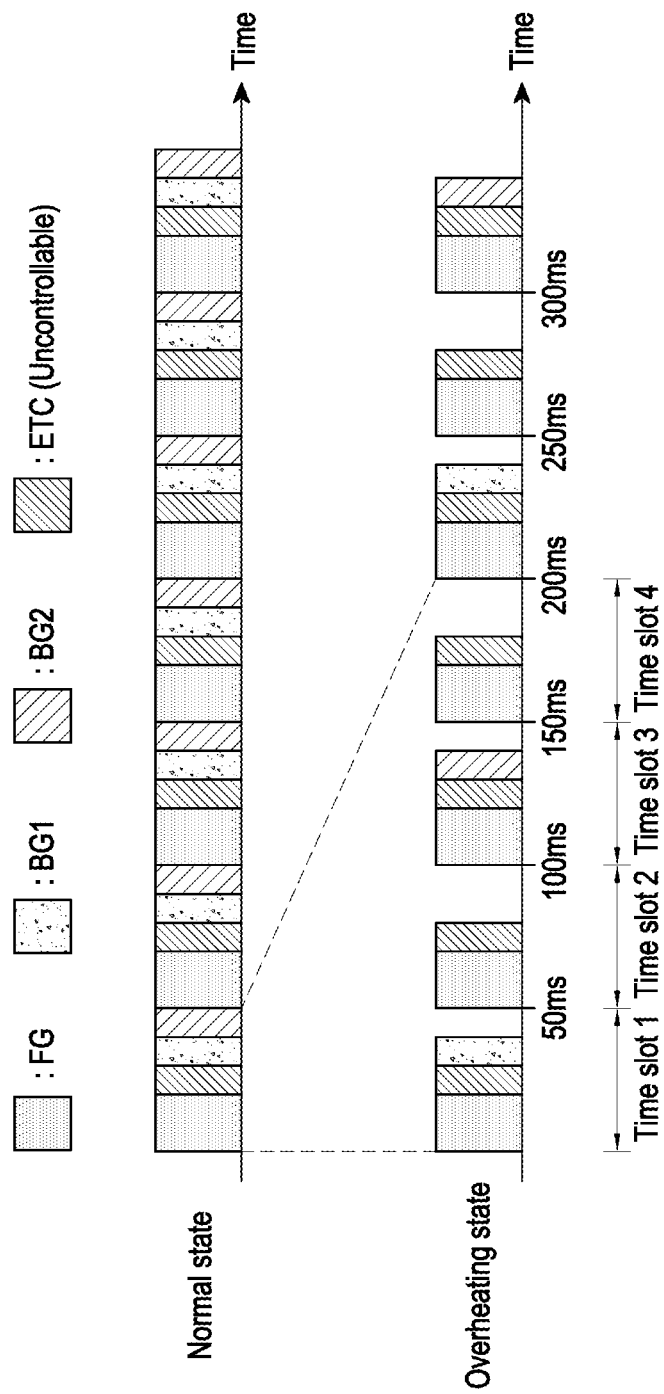
FIG. 7 illustrates an example of background process scheduling in a normal state and an example of background process scheduling in a first overheating level according to an example embodiment.

FIG. 7 illustrates an example of background process scheduling in a normal state and an example of background process scheduling in a first overheating level according to an embodiment.

Referring to FIG. 7, a processor (e.g., the processor 120 in FIG. 1 or the processor 220 in FIG. 2) (hereinafter, the processor 220 in FIG. 2 will be described as an example) of an electronic device (e.g., the electronic device 101 in FIG. 1 or the electronic device 201 in FIG. 2) according to an embodiment may perform control such that processes (e.g., a foreground process FG, a first background process group BG1, and a second background group BG2) executed (or processed) in one time slot (time slot 1) in a normal state are distributed to multiple time slots (four time slots or time slot 1 to time slot 4) in an overheating state (a first overheating level) and executed (or processed). For example, when two background groups BG1 and BG2 are identified in the first overheating level, the processor 220 may identify, as 2, the number of time slots corresponding to a first time interval associate with BG1 and BG2, and may identify, as 1*2, the number of time slots corresponding to a second time interval which is an idle period after the first time interval or between first time intervals. For example, the processor 220 may perform second scheduling for the processes (e.g., the foreground process FG, the first background process group BG1, and the second background group BG2) in the first overheating level, based on the time slots (e.g., time slot 1, time slot 3 . . . ) corresponding to the first time interval associated with BG1 and BG2 in the first overheating level and the time slots corresponding to the second time interval which is an idle period after the time slots (e.g., time slot 2, time slot 4 . . . ) corresponding to the first time interval. The processor 220 according to an embodiment may repeat operations of executing BG1 or BG2 for 50 ms when one time slot unit is 50 ms and two background groups are identified in the first overheating level, stopping (resting) the background process execution for next 50 ms when the first overheating level is released, an overheat control condition is changed, or overheat control is stopped, executing BG1 or BG2 again for 50 ms, and stopping (resting) the background process execution for the next 50 ms.

Figure 8:
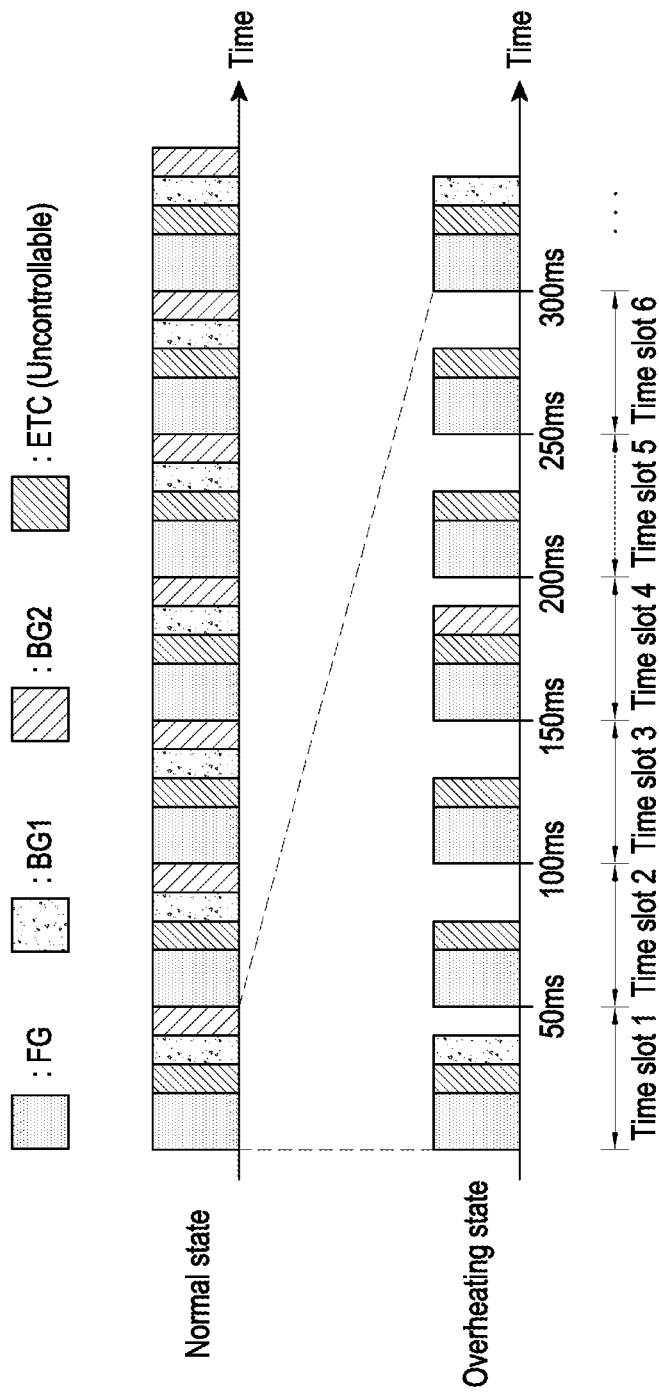
FIG. 8 illustrates an example of background process scheduling in a normal state and an example of background process scheduling in a second overheating level according to an example embodiment.

FIG. 8 illustrates an example of background process scheduling in a normal state and an example of background process scheduling in a second overheating level according to an embodiment.

Referring to FIG. 8, a processor (e.g., the processor 120 in FIG. 1 or the processor 220 in FIG. 2) (hereinafter, the processor 220 in FIG. 2 will be described as an example) of an electronic device (e.g., the electronic device 101 in FIG. 1 or the electronic device 201 in FIG. 2) according to an embodiment may perform control such that processes (e.g., a foreground process FG, a first background process group BG1, and a second background group BG2) executed (or processed) in one time slot (e.g., time slot 1) in a normal state are distributed to multiple time slots (e.g., six time slots or time slot 1 to time slot 6) in an overheating state (a second overheating level) and executed (or processed). For example, when two background groups BG1 and BG2 are identified in the second overheating level, the processor 220 may identify, as 2, the number of time slots corresponding to a first time interval associate with BG1 and BG2, and may identify, as 2*2, the number of time slots corresponding to a second time interval which is an idle period after the first time interval or between first time intervals. For example, the processor 220 may perform second scheduling for the processes (e.g., the foreground process FG, the first background process group BG1, and the second background group BG2) in a second overheating level, based on the time slots (e.g., time slot 1, time slot 4 . . . ) corresponding to the first time interval associated with BG1 and BG2 in the second overheating level and the time slots (e.g., time slot 2, time slot 3, time slot 5, time slot 6 . . . ) corresponding to the second time interval which is an idle period after the time slots corresponding to the first time interval. The processor 220 according to an embodiment may repeat operations of executing BG1 or BG2 for 50 ms when one time slot unit is 50 ms and when two background groups are identified in the second overheating level, stopping (resting) the background process execution for next two 50 ms when the second overheating level is released, an overheat control condition is changed, or overheat control is stopped, executing BG1 or BG2 again for 50 ms, and stopping (resting) the background process execution for next two 50 ms.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via at least a third element.

As used in connection with the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, in a non-volatile storage medium storing commands, the commands may be configured to cause, when being executed by at least one processor, the at least one processor to perform at least one operation, and the at least one operation may include identifying whether the electronic device is in an overheating state, performing first scheduling by using a scheduling method designated for processes, when the electronic device is not in the overheating state, and controlling the processes based on the first scheduling, and, when the electronic device is in the overheating state, identifying processor usage of at least one background process among the processes, identifying at least one background process group based on the processor usage of the at least one background process, identifying a first time interval, in which the at least one background process group operates, and a second time interval, in which the at least one background process group does not operate, performing second scheduling for the processes based on the first time interval and the second time interval, and controlling the processes based on the second scheduling.

The embodiments of the disclosure described in the specification and the drawings are merely specific examples that have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the technical idea of the disclosure. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a communication module comprising communication circuitry;
a temperature sensor;
a memory; and
a processor operatively connected to the communication module, the temperature sensor, and the memory,
wherein the processor is configured to:
identify whether the electronic device is in an overheating state,
based on a determination that the electronic device is not in the overheating state, perform first scheduling at least by using a scheduling technique designated for processes, and control the processes based on the first scheduling, and
based on a determination that the electronic device is in the overheating state, identify processor usage of at least one background process among the processes, identify at least one background process group based on the processor usage of the at least one background process, identify a first time interval, in which the at least one background process group operates, and a second time interval, in which the at least one background process group does not operate, perform second scheduling for the processes based on the first time interval and the second time interval, and control the processes based on the second scheduling.

2. The electronic device of claim 1, wherein the processor is configured to identify an overheating level of the electronic device in the overheating state.

3. The electronic device of claim 2, wherein the processor is configured to identify a processor usage limit value corresponding to the overheating state or identify a processor usage limit value corresponding to the overheating level.

4. The electronic device of claim 3, wherein the processor usage limit value corresponding to the overheating level is configured to decrease as the overheating level increases.

5. The electronic device of claim 3, wherein the processor is configured to identify the at least one background process group, based on the processor usage limit value and the processor usage of the at least one background process.

6. The electronic device of claim 1, wherein the processor is configured to identify, based on the number of the at least one background process group, the number of time slots corresponding to the first time interval and the number of time slots corresponding to the second time interval, and perform the second scheduling for the processes, based on the number of time slots corresponding to the first time interval and the number of time slots corresponding to the second time interval.

7. The electronic device of claim 6, wherein the number of time slots corresponding to the second time interval is configured to have a greater value than the number of time slots corresponding to the first time interval as the overheating level of the electronic device increases.

8. The electronic device of claim 6, wherein the processor is configured to identify the number of time slots corresponding to the first time interval as N and the number of time slots corresponding to the second time interval as N when the number of the at least one background process group at a first overheating level is N.

9. The electronic device of claim 8, wherein the processor is configured to identify the number of time slots corresponding to the first time interval as N and the number of time slots corresponding to the second time interval as 2*N when the number of the at least one background process group at a second overheating level is N.

10. The electronic device of claim 1, wherein the processes comprise a foreground process, a default process, and the at least one background process.

11. A method for controlling overheating based on background process control in an electronic device, the method comprising:
   identifying whether the electronic device is in an overheating state;
   when the electronic device is not in the overheating state, performing first scheduling by using a scheduling method designated for processes, and controlling the processes based on the first scheduling; and
   when the electronic device is in the overheating state, identifying processor usage of at least one background process among the processes, identifying at least one background process group based on the processor usage of the at least one background process, identifying a first time interval, in which the at least one background process group operates, and a second time interval, in which the at least one background process group does not operate, performing second scheduling for the processes based on the first time interval and the second time interval, and controlling the processes based on the second scheduling.

12. The method of claim 11, further comprising identifying an overheating level of the electronic device in the overheating state.

13. The method of claim 12, further comprising identifying a processor usage limit value corresponding to the overheating state or identifying a processor usage limit value corresponding to the overheating level.

14. The method of claim 13, wherein the processor usage limit value corresponding to the overheating level is configured to decrease as the overheating level increases.

15. The method of claim 13, further comprising identifying the at least one background process group, based on the processor usage limit value and the processor usage of the at least one background process.

16. The method of claim 12, further comprising:
   identifying, based on the number of the at least one background process group, the number of time slots corresponding to the first time interval and the number of time slots corresponding to the second time interval; and
   performing the second scheduling for the processes, based on the number of time slots corresponding to the first time interval and the number of time slots corresponding to the second time interval.

17. The method of claim 16, wherein the number of time slots corresponding to the second time interval is configured to have a greater value than the number of time slots corresponding to the first time interval as the overheating level of the electronic device increases.

18. The method of claim 17, further comprising identifying the number of time slots corresponding to the first time interval as N and the number of time slots corresponding to the second time interval as N when the number of the at least one background process group at a first overheating level is N.

19. The method of claim 18, further comprising identifying the number of time slots corresponding to the first time interval as N and the number of time slots corresponding to the second time interval as 2*N when the number of the at least one background process group at a second overheating level is N.

20. A non-volatile storage medium storing commands, wherein the commands are configured to cause, when being executed by at least one processor, the at least one processor to perform at least one operation, and
   the at least one operation comprises:
   identifying whether an electronic device is in an overheating state;
   when the electronic device is not in the overheating state, performing first scheduling by using a scheduling method designated for processes, and controlling the processes based on the first scheduling; and
   when the electronic device is in the overheating state, identifying processor usage of at least one background process among the processes, identifying at least one background process group based on the processor usage of the at least one background process, identifying a first time interval, in which the at least one background process group operates, and a second time interval, in which the at least one background process group does not operate, performing second scheduling for the processes based on the first time interval and the second time interval, and controlling the processes based on the second scheduling.

* * * * *